Figure 1:
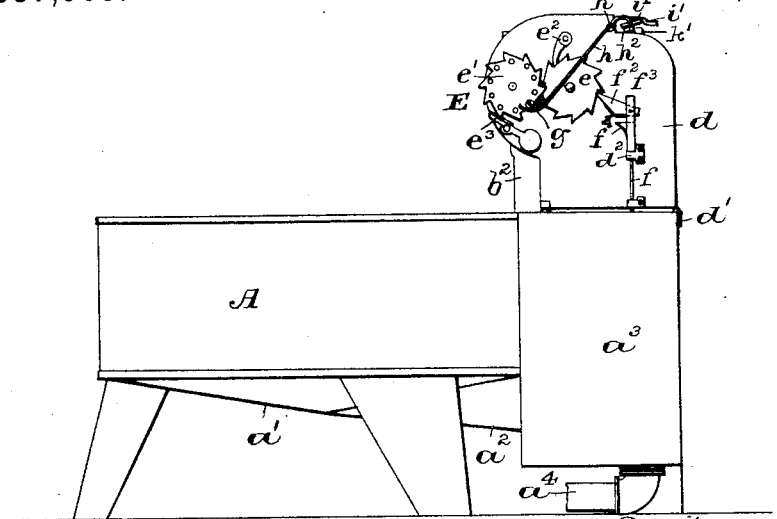

(No Model.) 5 Sheets—Sheet 1.

C. J. DORTICUS.
PHOTOGRAPHIC PRINT WASHER.

No. 537,968. Patented Apr. 23, 1895.

WITNESSES:
Wm H Canfield Jr
A. M. Marsh

INVENTOR:
Clatonia Joaquin Dorticus
BY Fred C. Fraentzel, ATT'Y.

(No Model.) 5 Sheets—Sheet 2.

C. J. DORTICUS.
PHOTOGRAPHIC PRINT WASHER.

No. 537,968. Patented Apr. 23, 1895.

WITNESSES: INVENTOR:
Wm. H. Canfield Jr. Clatonia Joaquin Dorticus,
H. W. Marsh. BY Fred C. Fraentzel, ATT'Y.

THE NORRIS PETERS CO., PHOTO-LITHO., WASHINGTON, D. C.

(No Model.) 5 Sheets—Sheet 4.

C. J. DORTICUS.
PHOTOGRAPHIC PRINT WASHER.

No. 537,968. Patented Apr. 23, 1895.

WITNESSES:
Wm. H. Camfield Jr.
H. W. Marsh

INVENTOR:
Clatonia Joaquin Dorticus
BY Fred H. Frantzel, ATT'Y.

(No Model.) 5 Sheets—Sheet 5.

C. J. DORTICUS.
PHOTOGRAPHIC PRINT WASHER.

No. 537,968. Patented Apr. 23, 1895.

WITNESSES:
Wm. H. Canfield Jr.
H. W. Marsh

INVENTOR
Clatonia Joaquin Dorticus,
BY Fred C. Fraentzel, ATT'Y.

UNITED STATES PATENT OFFICE.

CLATONIA JOAQUIN DORTICUS, OF NEWTON, NEW JERSEY.

PHOTOGRAPHIC-PRINT WASHER.

SPECIFICATION forming part of Letters Patent No. 537,968, dated April 23, 1895.

Application filed June 7, 1893. Serial No. 476,812. (No model.)

*To all whom it may concern:*

Be it known that I, CLATONIA JOAQUIN DORTICUS, a citizen of the United States, residing at Newton, in the county of Sussex and State of New Jersey, have invented certain new and useful Improvements in Photographic Print or Negative Washers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a novel construction of photographic print or negative washer or bath, in which photographic bromid and platinotype or gelatin negatives can be successfully washed, to effect the elimination of the sodium hyposulfite and other chemicals from the prints or negatives in a short time, that the brilliancy of the albumen or aristotype surface will not be softened and dulled, (as is the case in long continued washing,) or the permanency of the negatives enhanced.

A further object of the invention is to provide a bath for the purposes herein set forth, which shall be of such construction to prevent photographs from being unnecessarily washed, to prevent them from sticking to the sides of the pan, to prevent them from congregating in the center of the bath, to prevent the tearing and bruising of the photographs during washing, to prevent the bath overflowing, and to insure continuous movement of the pictures during washing.

A further object of the invention is to keep the pictures in a current of water, the exit of which is controlled by means of an adjustable siphon, further, to register the number of changes of water, to automatically shut off the water supply when the photos or pictures have been sufficiently washed, and finally, to automatically shut off the water supply when an overflow is threatened, and to give an alarm when the water supply is shut off.

My invention therefore consists, broadly, in the construction and combination of parts to attain the above ends, as will be hereinafter more fully set forth and finally embodied in the claims.

The invention further consists in certain details of construction, such as a circular or other shaped tank, pan or trough, with corrugated or uneven sides, and a supply pipe at the top or bottom thereof, whereby the water is introduced into the tank at an angle to produce a circular flow or current.

The invention further consists of a tank, pan or trough having a partitioned well, which contains respectively an adjustable automatic siphon and a float adapted to operate a registering mechanism and to automatically shut off the supply of water when necessary. The bottom of said siphon pipe is situated at the lowest point in the well and is larger than the supply pipe so that the draw-off by the siphon is in excess of the inflow.

Reference is to be had to the accompanying drawings, forming a part of this specification, and in which similar letters of reference indicate corresponding parts in all the figures.

Figure 2:
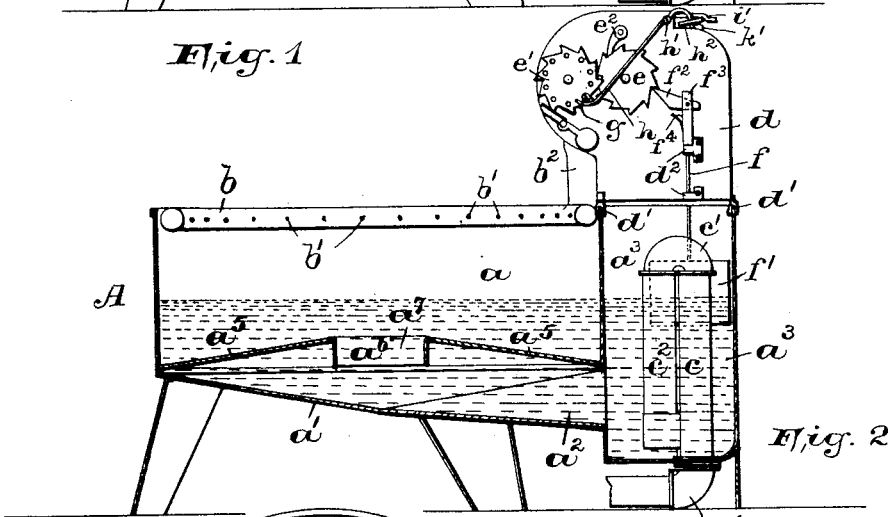
Figure 3:
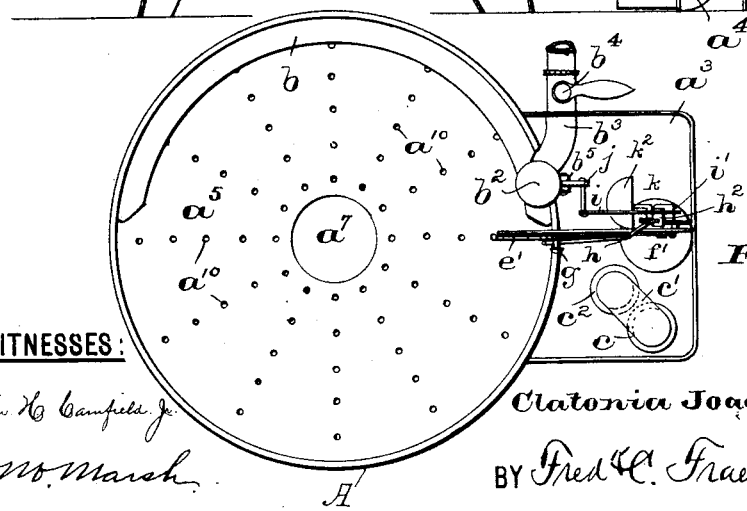
Figure 4:
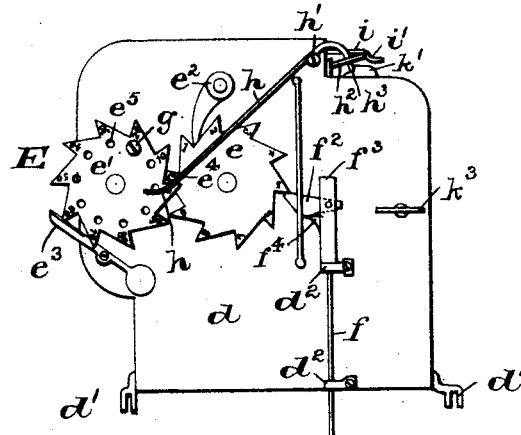
Figure 5:
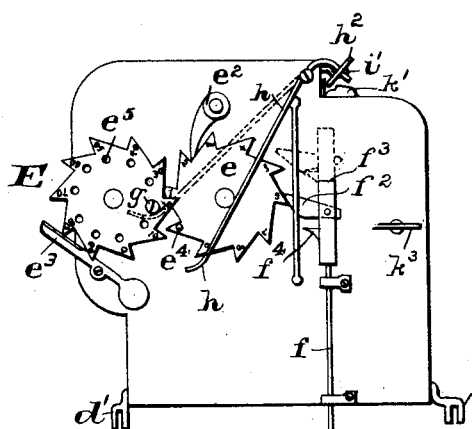
Figure 6:
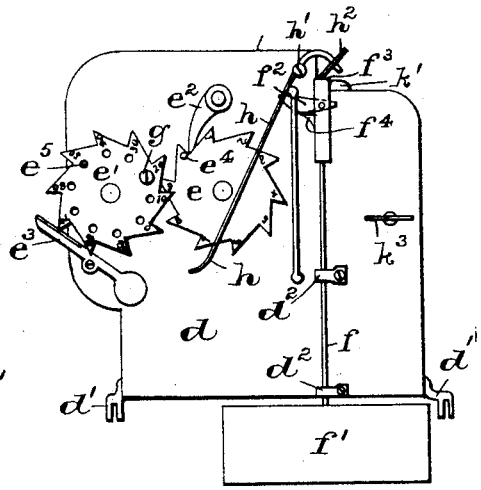
Figure 7:
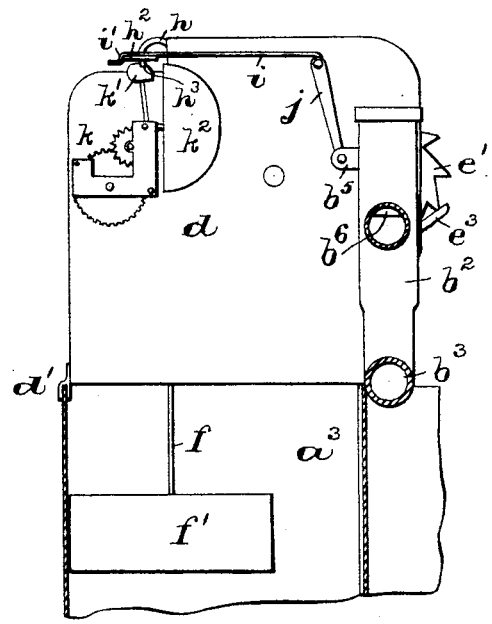
Figure 8:
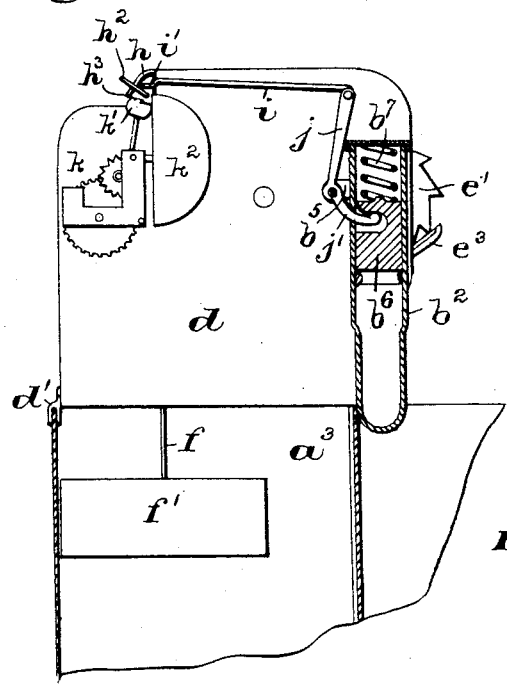
Figure 9:
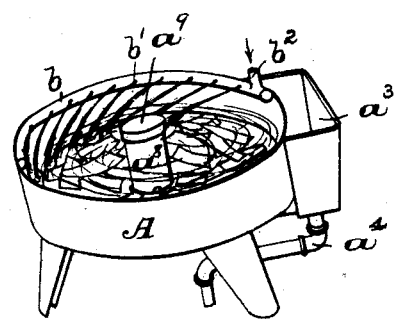
Figure 10:
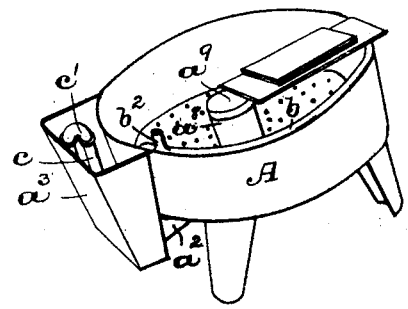
Figure 11:
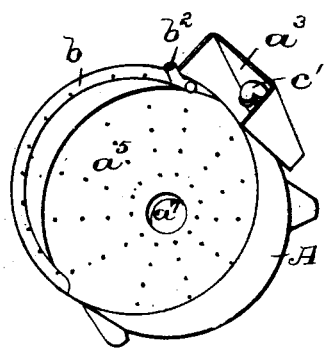
Figure 12:
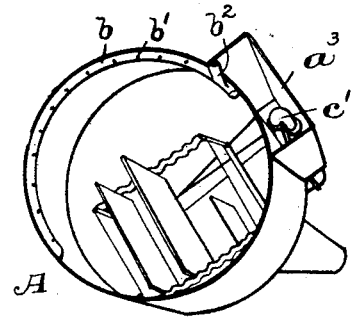
Figure 13:
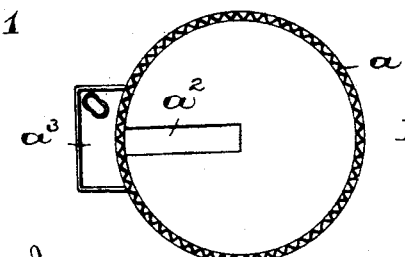
Figures 14, 15:
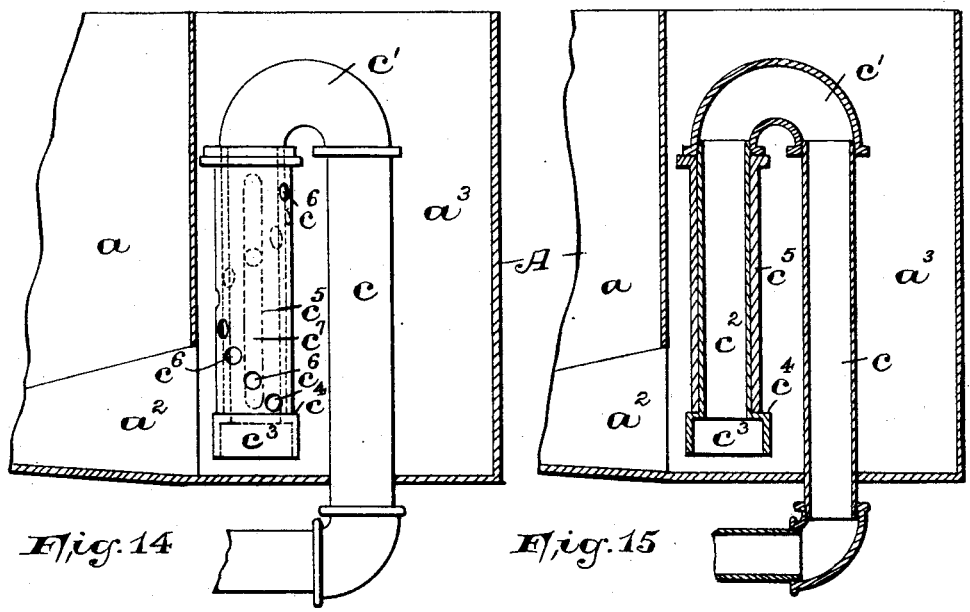
Figures 16, 17:
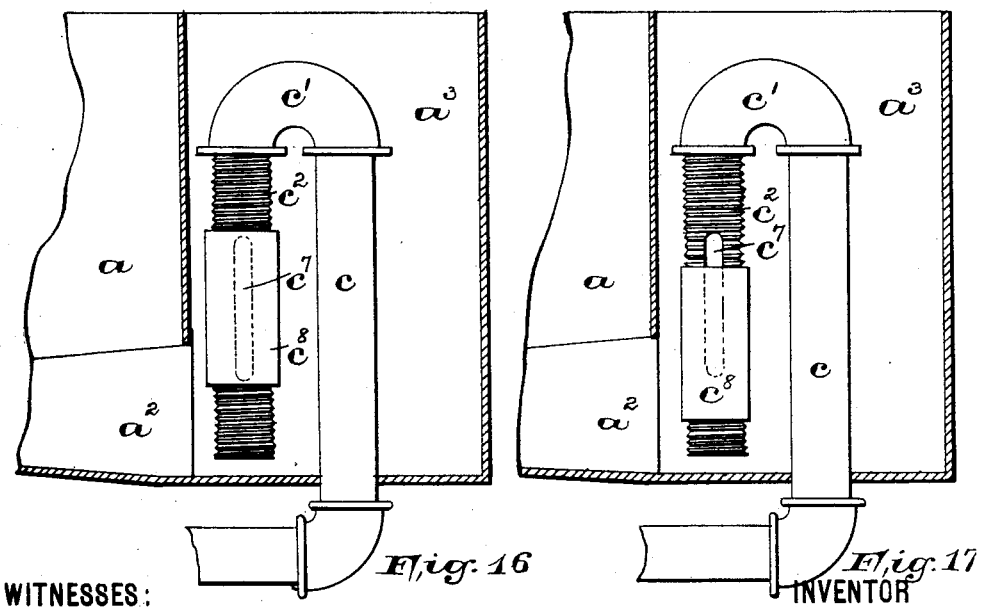

In the accompanying drawings, Figure 1 is a side elevation of an apparatus embodying my improvements for washing photographic prints and negatives. Fig. 2 is a longitudinal section of the same, clearly illustrating the inner construction of the wash tank or trough and the siphon well connected therewith, and also a float and a registering mechanism, for recording the number of changes of water desired in the apparatus; and Fig. 3 is a top view of the apparatus. Fig. 4 is a front elevation of the registering device and its float, illustrating the several parts thereof in their normal positions. Fig. 5 is a similar view of said parts, clearly illustrating the positions of the float and the mechanism connected therewith, the dotted position of said float and lever indicating the positions of said parts at the time when the photographs have been washed the reuqired number of times, and after the last washing of which the supply of water is automatically cut off; and Fig. 6 is a like view of said parts, illustrating the positions of the several mechanisms, when an overflow is threatened and to give an alarm when the water supply is shut off. Fig. 7 is a rear view of said registering mechanism clearly illustrating one arrangement of an alarm, a water supply valve and a system of intermediately arranged levers adapted to be operated by the float to automatically shut off the water supply, all of said parts being illustrated in their normal inoperative positions, and Fig. 8 is a similar view of the parts illustrated in Fig. 7, the water supply well, however, being represented in vertical section, and the intermediately arranged system of levers being illustrated in that position after they have been released by the float in the well connected with the washing tank. Fig. 9 is a perspective view of said washing tank or trough and the well connected therewith, to give a clearer idea of washing small photographs. Fig. 10 is a similar view of said tank and well, illustrating in connection therewith a centrally and removably placed post, upon which, and the edge of the tank can be laid a glass or other plate for drying the pictures. Fig. 11 is a similar view of said tank and well with said central post and the false bottom in the tank removed, and Fig. 12 is a view similar to that illustrated in Fig. 11, when said central post and false bottom have been removed, to enable the tank to be used for washing negatives, and Fig. 13 is a horizontal section of said tank or trough to more clearly illustrate the arrangement of the corrugated or uneven sides of the tank. Fig. 14 is a sectional view of the well connected with the tank, illustrating in side elevation one form of adjustable siphon, and Fig. 15 is a vertical section of all of said parts illustrated in said Fig. 14. Figs. 16 and 17 are elevations of a siphon of a slightly modified form of construction illustrating the arrangement of a sleeve in its inoperative and operative positions respectively for siphoning the water from said well and tank.

In said drawings, A designates a circular or other shaped tank, pan or trough, which, as will be seen from Fig. 13, is preferably provided with the corrugated or uneven sides $a$. Said tank is preferably made of zinc or other analogous material, and is provided in any suitable position, preferably at the top with a water supply-pipe $b$, provided with perforations $b'$. Connected with said pipe $b$ is a suitable stand pipe $b^2$ having a valve therein, and connected with said pipe $b^2$ is the main supply pipe $b^3$ which may be provided with any suitable form of stop cock $b^4$, as will be seen from Fig. 3. Said tank A is preferably provided with a sloping bottom $a'$ and is connected by means of a duct $a^2$ with a suitable well $a^3$, in the bottom of which is an outflow $a^4$. Upon said cone-shaped bottom of the tank A, I may arrange a removable false bottom $a^5$, which is preferably formed as illustrated in Fig. 2, being provided with the upwardly flaring sides and inwardly and downwardly projecting portions $a^6$ forming a central opening $a^7$, in which opening, may be removably placed a post $a^8$ having a removable cover or cap $a^9$, as will be seen from Figs. 9 and 10. Said false bottom $a^5$ is also provided with perforations $a^{10}$, as will be seen from Fig. 3. From the several figures of the drawings, it will be seen, that within said well $a^3$ and connected with said outflow $a^4$, is a suitable siphon $c$, which may be of any ordinary construction, as shown in Fig. 2, siphoning directly from the bottom of the pipe; but instead of this form of siphon I may use the form of siphon illustrated more especially in Figs. 14 and 15.

Connected with the elbow $c'$ attached to the siphon $c$ is a pipe $c^2$, which is preferably screwed into said elbow and is provided at the bottom with an enlargement $c^3$ forming a shoulder or off-set $c^4$. Rotatively arranged upon said pipe $c^2$ and between the shoulder or off-set $c^4$ and the end of the elbow, is a pipe $c^5$ provided with spirally arranged holes or perforations $c^6$. In the inner pipe $c^2$ is a longitudinal slot or opening $c^7$. From an inspection of Fig. 14 it will be seen, that by this arrangement and construction of parts, I have made an adjustable siphon, in which, by the arrangement of said rotatively arranged pipe $c^5$ and the spirally placed holes therein, the water in the well and tank or trough A can be siphoned to any desired depth, whereby all danger of an overflow is avoided. In lieu of the adjustable siphon illustrated in said Figs. 14 and 15, said slotted pipe $c^2$ may be screw-threaded, as illustrated in Figs. 16 and 17, and on said thread may be arranged a screw-threaded sleeve $c^8$. This sleeve may be screwed up or down upon said pipe, whereby the slot $c^7$ in the pipe $c^2$ can be entirely closed or covered, or can be partly opened, as will be seen from Fig. 17.

As has been stated in the above, one of the objects of my invention is to provide a washing tank or receptacle in which photographic prints are placed for washing, so that they can be automatically washed by changing the water in the receptacle as frequently as desired, and after the last washing, the water will be automatically cut off, and retained in the tank at a certain height, according to the previously adjusted position of the revoluble pipe of the siphon.

As will be seen from Figs. 1 to 6 inclusive, upon the edges of that portion of the tank forming the well $a^3$, I have arranged a suitable bracket $d$, fastened to said edges of the tank by means of the clamps $d'$, or in any other well-known manner. Said bracket $d$ is provided with a suitable register E, consisting essentially of two ratchet disks $e$ and $e'$ respectively, with which are made to engage suitable pawls or dogs $e^2$ and $e^3$ respectively to prevent their turning backward. Adapted to move vertically in suitable bearings $d^2$ on said bracket $d$ is a rod $f$ provided at its lower end with a float $f'$, which floats upon the surface of the water in the well $a^3$, as will be seen from Fig. 2. Said rod $f$ is provided at or near its upper end with a pivotally arranged pawl or dog $f^2$ and a stop-piece or projection $f^3$. As the water in the tank A and in the well rises, said pawl $f^2$ is caused to engage with one of the numbered ratchet teeth on the disk $e$ and thereby advances said disk one tooth, every time the tank has been again filled after having been previously emptied by the action of the siphon. On one of said ratchet teeth on the disk $e$ is arranged a pin or projection $e^4$, which, after the disk $e$ has made one complete revolution, engages with one of the teeth on the ratchet disk $e'$ and causes the latter to move one tooth. In this manner, as will be clearly understood, each washing of the prints will be indicated by the numbers on the disks.

The disks in the present case are made to register from one to one hundred.

In order to automatically shut off the supply of water, after the prints or negatives have been successively washed the required number of times, I have provided the ratchet disk $e'$ with a series of screw-threaded holes $e^5$, one to each ratchet tooth, and into any one of said holes can be screwed a pin $g$. I have shown this pin screwed in the hole marked "20," in the present case. Thus it will be seen that after the water in the tank and well $a^3$ has been siphoned or drawn off nineteen times and the projection or pin $e^4$ has engaged with the tooth on the disk $e'$ opposite said pin $g$ and causes it to advance forward, said pin $g$ engages with a curved end of a pivoted lever $h$, (see the dotted position in Fig. 5,) and said lever assumes the position indicated in said Fig. 5. Said lever $h$, which is pivoted at $h'$ to said bracket $d$, is provided with a holding portion $h^2$, with which the operator before he turns on the water and thereby starts the washing operation, places in holding engagement the bent or hooked-shaped end $i'$ of a rod $i$ which is pivotally connected with an arm $j$, and which is pivoted in a bearing $b^5$ of the valve chamber $b^2$ in the water supply-pipe. As will be noticed from Fig. 8, said arm $j$ is provided with a suitable holding or operating finger or spur $j'$, whereby, when the end $i'$ of the rod $i$ is in holding engagement with the holding portion $h^2$ of the lever $h$, the valve-plug $b^6$ is off its seat and permits the flow of water through the pipe $b$ into the tank A; but as soon as the pin $g$ has operated the lever $h$ and thereby caused the disengagement of the end $i'$ of the rod $i$ with the said holding portion $h^2$, as illustrated in Fig. 5, a spring $b^7$ on the valve-plug $b^6$ shuts off the water supply, as will be readily understood from an inspection of Fig. 8. At the same time, an alarm mechanism $k$, which may be arranged on the back of the bracket $d$, and the striking hammer $k'$ of which is also in holding engagement with the end $h^3$ of said lever $h$, is released and the hammer $k'$ is free to ring the bell of gong $k^2$.

The striking mechanism, which may be of any suitable form and construction, can be wound on by a key $k^3$, shown in Figs. 4, 5 and 6.

Thus it will be evident, that after the operator has set this mechanism of the apparatus, the prints or negatives can be washed the desired number of times, after which the water supply is automatically shut off and this fact is indicated by the ringing of the alarm.

Should for some unforseen cause, the siphon not work properly and an overflow of the water be threatened, the upper end $f^3$ of the rod $f$ on the float will come in contact with the holding portion $h^2$ on the pivoted lever $h$, which will release the hook end $i'$ of the rod $i$, as indicated in Fig. 6, whereby the valve plug $b^6$ automatically shuts off the water supply, and the fact thereof is indicated by the ringing of the alarm, and also the number of washes made to this time are indicated on the register.

Of course it will be understood, that the pin $g$ can be placed into any one of the holes $e^5$ in said disk $e'$, whereby the number of washings can be increased or decreased, at the will of the operator and the water supply can be automatically shut off at any stage of the washing operation.

When I desire to wash small prints, I place the post $a^8$ in the opening $a^6$ of the false bottom, and upon said post I place the cap $c^9$, as illustrated in Fig. 9. The supply of water is forced at an angle toward the center of the tank thereby causing a slight current, which moves the prints about the central post $a^8$, whereby they become thoroughly washed, the chemicals in the prints being removed therefrom by the successive washings, as has been described in the above, and passing through the perforations $a^{10}$ in the false bottom to the lower bottom of the tank A and into the well $a^3$ from which they are siphoned off. The chemicals being heavy, will settle to the bottom of the tank and the siphon drawing from the bottom of the well will successfully remove the objectionable portions of washwater, while at the same time a clean supply of fresh water is added through the pipe $b$, until the prints have been sufficiently washed and the supply of water is automatically shut off. After the prints have been sufficiently washed, I can place a glass or other suitable plate $m$ on the top of said post $a^8$ and the edge of the tank A, upon which the prints can be placed and allowed to drain off, as will be evident. After the last washing of the prints, owing to the adjustable arrangement of the siphon, there will be at all times a sufficient depth of water remaining in the tank A, to prevent the prints from becoming dry, which causes the folding or curling of the same and renders them difficult to mount. It also prevents the sticking together of the prints and hence prevents loss.

When I desire to use the tank for the washing of large prints, I remove the post $a^8$ and place the cap $a^9$ in the opening $a^6$ in the false bottom, as will be clearly understood.

By removing the false bottom $a^5$, as illustrated in Fig. 11, a perfect tank is the result in which can be placed a negative holder or frame with the negatives therein, as shown in Fig. 12, and all the objectionable chemicals removed from the negatives, should they accidentally remain in the tank, will settle on the bottom of the tank, and when the false bottom is again placed in position, a clean bottom is provided for the prints to be washed.

Thus it will be seen that the prints cannot be destroyed by the chemicals which might remain in the bottom of the tank from previous washings, and a photographic washer is provided which can be used for the washing of prints as well as negatives.

As has been previously stated, the tank, which may be of any shape, is preferably made with corrugated or uneven sides, which prevents the sticking of the prints against the sides, which would ruin them, and when the apparatus is in operation, the water will be delivered in fine sprays and with such uniform velocity, that the prints or negatives will be uniformly washed in a very short time, and with but little expenditure of water, when it is difficult to obtain the latter in large quantities.

One great advantage in my form of apparatus is, that the hypo salts, which are heavier than water, will fall to the bottom of the tank and remain, if not sufficiently removed by the siphon, beneath the false bottom, in which case the film on the prints will be protected from any sediment that may be left in the water.

I do not wish to limit myself to the exact forms of construction herein shown, as certain parts of the construction may be varied without departing from the scope of my present invention.

The principal features of my invention are, first, a print or negative washer having a removable false bottom, whereby a combined print and negative washing tank is the result; secondly, the construction of a tank for the purposes herein set forth, having corrugated or uneven sides, which prevents the sticking of the prints to the sides of the tank; thirdly, the arrangement of an adjustable siphon; fourthly, the arrangement of an automatic register and an automatic water shut-off; fifthly, the arrangement of the perforated water supply pipe, and, lastly, the general arrangement and combinations of the features to produce a complete apparatus.

Having thus described my invention, what I claim is—

1. In a photographic print or negative washer, in combination, a tank or pan provided with corrugated or uneven sides $a$ and a conical bottom, to prevent photographs, while being washed, from sticking to the sides of the tank and congregating in the center thereof, a well connected with said tank or pan, and a siphon in said well, substantially as and for the purposes set forth.

2. In a photographic print or negative washer, in combination, a tank or pan provided with corrugated or uneven sides $a$ and a conical bottom, a false bottom, as $a^5$ in said tank, having upwardly flaring sides, all of said parts being constructed and arranged to prevent photographs, while being washed, from sticking to the sides of the tank and congregating in the center thereof, a well connected with said tank or pan, and a siphon in said well, substantially as and for the purposes set forth.

3. In a photographic print or negative washer, the combination, of a tank and a well connected therewith, of an automatic register and a float in said well adapted to operate said register, substantially as and for the purposes set forth.

4. In a photographic print or negative washer, the combination, of a tank and a well connected therewith, of an automatic register, a float in said well adapted to operate said register, a water supply pipe, and a valve therein, and mechanism adapted to be operated by said register and float to close said valve, substantially as and for the purposes set forth.

5. In a photographic print or negative washer, the combination, of a tank and a well connected therewith, of an automatic register, an alarm connected therewith, and a float in said well adapted to operate said register, a water supply pipe and a valve therein, and mechanism adapted to be operated by said register and float to close said valve, substantially as and for the purposes set forth.

6. The herein described photographic print or negative washer, comprising therein, a tank A provided with the corrugated or uneven sides $a$ and a conical bottom, to prevent photographs, while being washed, from sticking to the sides of the tank and congregating in the center thereof, substantially as and for the purposes set forth.

7. In a photographic print or negative washer, the combination, of a tank or pan having a detachably arranged cone-shaped false bottom, provided with an opening $a^5$ and a post $a^8$ adapted to be arranged in said opening, substantially as and for the purposes set forth.

8. The herein described photographic print or negative washer, comprising therein, a tank A provided with the corrugated or uneven sides $a$, a conical bottom, and a false bottom $a^5$, removably arranged in said tank, having upwardly flaring sides, all of said parts being constructed and arranged to prevent photographs, while being washed, from sticking to the sides of the tank and congregating in the center thereof, substantially as and for the purposes set forth.

In testimony that I claim the invention set forth above I have hereunto set my hand this 18th day of May, 1893.

CLATONIA JOAQUIN DORTICUS.

Witnesses:
  FREDK. C. FRAENTZEL,
  WM. H. CAMFIELD, Jr.